United States Patent
Folchert et al.

(10) Patent No.: US 8,490,991 B2
(45) Date of Patent: Jul. 23, 2013

(54) METHOD FOR CONTROLLING THE REGENERATION CYCLES FOR AN AIR DRYER IN A CLOSED RIDE CONTROL SYSTEM FOR VEHICLES

(75) Inventors: Uwe Folchert, Lauenau (DE); Heike Ilias, Wedemark (DE); Christian Witala, Hannover (DE); Dierk Hein, Wedemark (DE)

(73) Assignee: Continental Teves AG & CO oHG, Frankfurt (DE)

( * ) Notice: Subject to any disclaimer, the term of this patent is extended or adjusted under 35 U.S.C. 154(b) by 54 days.

(21) Appl. No.: 13/146,139

(22) PCT Filed: Nov. 3, 2009

(86) PCT No.: PCT/EP2009/064478
§ 371 (c)(1),
(2), (4) Date: Jul. 25, 2011

(87) PCT Pub. No.: WO2010/086038
PCT Pub. Date: Aug. 5, 2010

(65) Prior Publication Data
US 2011/0278804 A1 Nov. 17, 2011

(30) Foreign Application Priority Data
Jan. 28, 2009 (DE) .......................... 10 2009 003 396

(51) Int. Cl.
*B60G 11/26* (2006.01)
(52) U.S. Cl.
USPC .................................................. 280/124.16
(58) Field of Classification Search
USPC ......... 280/5.514, 124.104, 124.106, 124.157, 280/124.158, 124.159, 124.16, 124.161; 267/64.16, 64.28
See application file for complete search history.

(56) References Cited

U.S. PATENT DOCUMENTS

| | | | |
|---|---|---|---|
| 6,089,831 A | 7/2000 | Bruehmann | |
| 6,332,623 B1 * | 12/2001 | Behmenburg et al. | ... 280/124.16 |
| 7,624,994 B2 * | 12/2009 | Stegmann | .................. 280/5.514 |
| 2002/0112366 A1 | 8/2002 | Larsson | |
| 2002/0136645 A1 | 9/2002 | Folchert | |

(Continued)

FOREIGN PATENT DOCUMENTS

| | | |
|---|---|---|
| DE | 3139682 | 5/1983 |
| DE | 69013167 | 5/1995 |

(Continued)

OTHER PUBLICATIONS

International Search Report issued in PCT/EP2009/064478 filed Nov. 3, 2009, mailed Feb. 8, 2010.

*Primary Examiner* — Joseph Rocca
*Assistant Examiner* — Robert A Coker
(74) *Attorney, Agent, or Firm* — RatnerPrestia

(57) ABSTRACT

A method for controlling the regeneration cycles for an air dryer in a closed ride height control system for vehicles. Compressed air chambers and a compressed air storage reservoir are charged with compressed air and ventilated via a compressed air line, or are charged via a compressed air intake line connected to the compressor and ventilated via the compressed air line. Compressed air quantity delivered through the dryer by the compressor, and temperature and/or the humidity of the air sucked in from the atmosphere are measured. The dryer is considered saturated under the assumption that air sucked in by the compressor and delivered through the air dryer is at the highest possible ambient temperature and humidity. Regeneration air quantity required for the compressed air quantity for the dryer to attain the desired dew point is determined as a function of the ambient temperature and/or the humidity of the intake air.

4 Claims, 1 Drawing Sheet

U.S. PATENT DOCUMENTS

| | | | |
|---|---|---|---|
| 2003/0047853 A1* | 3/2003 | Behmenburg | 267/64.28 |
| 2004/0026835 A1 | 2/2004 | Folchert | |
| 2009/0079155 A1* | 3/2009 | Rehra et al. | 280/124.16 |
| 2009/0082921 A1* | 3/2009 | Rehra et al. | 701/37 |

FOREIGN PATENT DOCUMENTS

| | | |
|---|---|---|
| DE | 19515895 | 10/1996 |
| DE | 19620851 | 12/1997 |
| DE | 10231251 | 8/2003 |
| EP | 0093253 | 11/1983 |
| EP | 1243447 | 9/2002 |
| EP | 1173270 | 5/2003 |
| EP | 2080914 | 7/2009 |
| WO | 9116224 | 10/1991 |

* cited by examiner

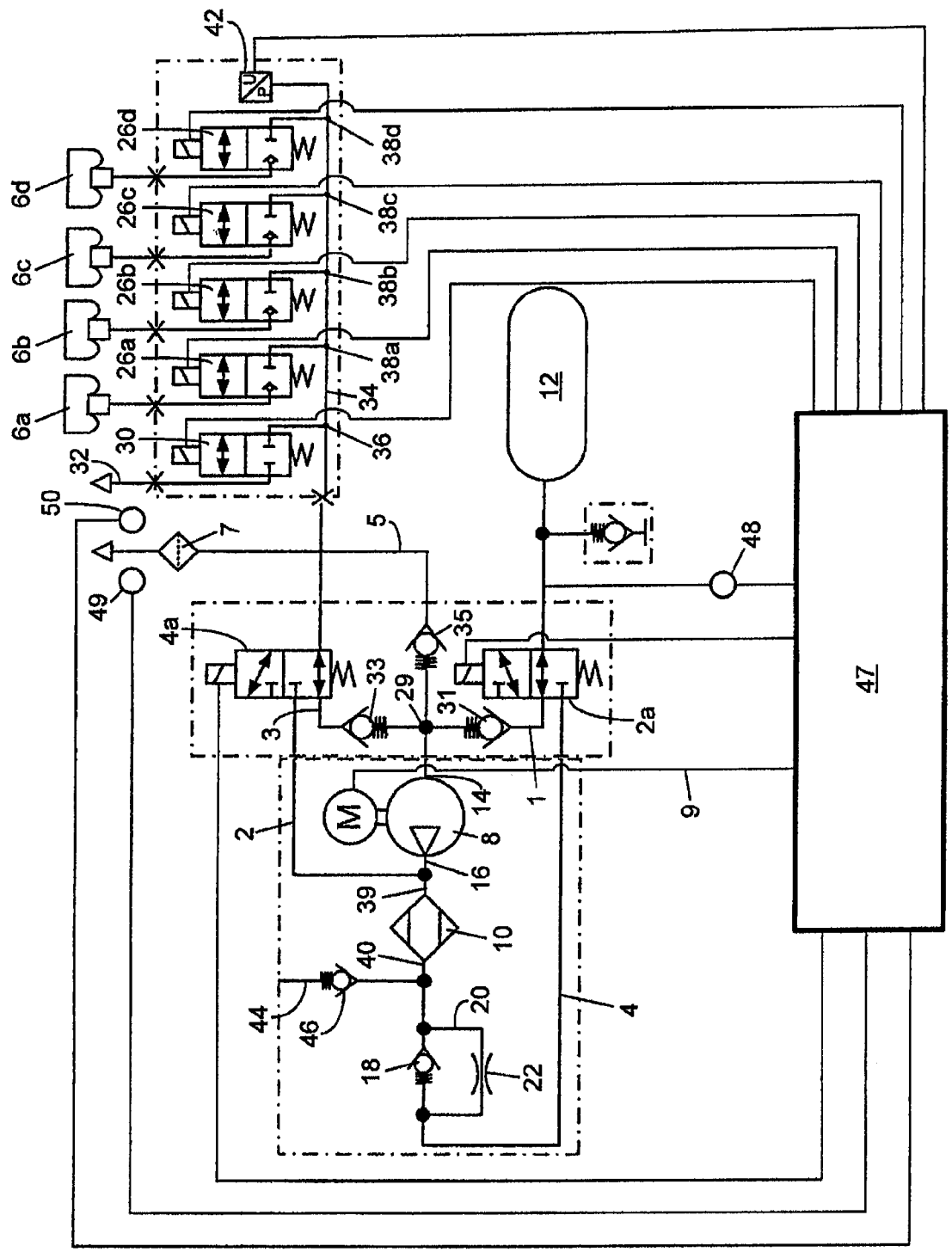

METHOD FOR CONTROLLING THE REGENERATION CYCLES FOR AN AIR DRYER IN A CLOSED RIDE CONTROL SYSTEM FOR VEHICLES

CROSS REFERENCE TO RELATED APPLICATIONS

This application is the U.S. National Phase Application of PCT International Application No. PCT/EP2009/064478, filed Nov. 3, 2009, which claims priority to German Patent Application No. 10 2009 003 396.3, filed Jan. 28, 2009, the contents of such applications being incorporated by reference herein.

FIELD OF THE INVENTION

The invention relates to a method for controlling the regeneration cycles for an air dryer in a closed ride height control system for vehicles, by means of which ride height control system a vehicle body is suspended relative to at least one vehicle axle.

BACKGROUND OF THE INVENTION

A closed ride height control system for vehicles of the type mentioned in the introduction is known from the European patent application EP 1 243 447 A2, which is incorporated by reference, and the German patent DE 102 31 251 C1, which is incorporated by reference. The closed ride height control system known from said documents has two or four controllable directional control valves, a pressure medium storage reservoir and at least two pressure medium chambers with in each case one controllable directional control valve. With said ride height control system, it is possible for pressure medium to be transferred from the pressure medium chambers into the pressure medium storage reservoir and vice versa. Furthermore, air can be transferred from the atmosphere into the pressure medium storage reservoir, with the compressed air being dried in an air dryer before entering into the pressure medium storage reservoir. To regenerate the air dryer, pressure medium from the pressure medium storage reservoir can be expanded via a throttle and conducted, in the opposite direction as compared with the air drying process, through the air dryer and via a discharge valve to the atmosphere. In the embodiment described in EP 1 243 447 A2, the air is sucked out of the atmosphere via a directional control valve, and is ventilated via the same directional control valve for the regeneration of the air dryer. In contrast, the embodiment according to DE 102 31 251 C1 has an additional air intake line which is connected to the compressor, such that only the ventilation takes place via the directional control valve and the above-mentioned compressed air line.

Pneumatic ride height control systems require dry air in the system in order that the system components do not freeze and thereby become functionally impaired. For this purpose, a dew point is sought which prevents this.

In open ride height control systems and other pneumatic systems, in particular vehicle brake systems, the air delivered into the system minus a leakage can be used again for regenerating the dryer, such that virtually 100% of the delivered air is available for regeneration, and adequate dew points can be attained.

In both open and closed pneumatic systems, the regeneration can take place only when the compressor is not delivering compressed air into the system. Since compressed air consumption is higher in open systems than in closed systems, the compressor in open systems runs more frequently and for longer, and it is important to bring the regeneration cycles into line with times during which the compressor is not delivering compressed air.

For this purpose, DE 31 39 682 C2, which is incorporated by reference, discloses an air drying device for an open compressed air system, which has one or two humidity sensors arranged upstream and/or downstream of the air dryer and also has an air mass sensor. The regeneration of the air dryer is triggered by means of a pressure sensor every time a preset nominal pressure is reached in a compressed air storage reservoir. The regeneration time period is set as a function of the air humidity upstream and/or downstream of the air dryer.

EP 0 093 253 B2, which is incorporated by reference, discloses a control device for the regeneration of an air dryer for a pneumatic system, in particular of a vehicle brake system, in which, during idle operation of the compressor, in each case a regeneration air mass for drying is provided to the air dryer, which regeneration air mass is substantially proportional to the delivered air mass conducted through the air dryer during the preceding period of delivery operation of the compressor. If the time interval between two delivery cycles of the compressor is too short to allow the required regeneration air quantity to flow through the air dryer, measures are taken such that the regeneration air quantity deficit is added on to later regeneration cycles in order that the optimum drying of the air dryer can be made up during the next relatively long idle cycle of the compressor. Since the efficiency of the drying of the air dryer is lower at relatively low temperatures than at relatively high temperatures, a temperature sensor is provided which outputs a correction signal to the control device such that the regeneration air quantity determined in each case is dependent not only on the delivery rate of the compressor but also on the measured outside temperature.

In a further compressed air system described in EP 0 523 194 B1 (Published as DE 690 13 167 T2 and WO91/16224), which is incorporated by reference, a humidity sensor is provided which detects the humidity of the compressed air in the system and generates a regeneration control signal and a compressor control signal in order to interrupt the delivery of air by the compressor and regenerate the air dryer if the humidity of the compressed air in the system exceeds a predetermined value which indicates that the air dryer is saturated with moisture.

DE 196 20 851 A1, which is incorporated by reference, discloses an air treatment arrangement for compressed air, in particular for pneumatic brake systems of motor vehicles, which has a measurement device for the air quantity delivered through the air dryer. From the air volume thus determined, an electronic controller determines the point in time for the regeneration of the air dryer and the volume of the regeneration air required for the regeneration. A regeneration thus takes place only when a predetermined air quantity has flowed through the air dryer. The air quantity expended for the regeneration is dependent on the former air quantity. The regeneration air is extracted directly from the pressure system.

A method known from EP 1 173 270 B1, which is incorporated by reference, for regenerating air dryers is based on the volume of the dryer regeneration air required for regenerating the air dryer being determined in such a way that the system pressure, the outside temperature and the supplied air volume are measured and continuously transmitted to a control unit which, with regard to said parameters, controls the regeneration time and the supply of regeneration air to the air dryer.

With these systems and methods known from the prior art, it is sought to generate optimized regeneration cycles, which however cannot be directly transferred to closed pneumatic systems, in particular pneumatic ride-height control systems, because in closed systems delivered air may be discharged only proportionately, while on account of the way in which the system operates, compressed air must always remain in the system, and an adequate dew point must nevertheless be ensured.

Accordingly, the invention is based on the object of attaining, with as small a regeneration air quantity as possible, a dew point in the system which prevents freezing of system components and leaves a maximum air quantity in the system.

SUMMARY OF THE INVENTION

According to aspects of the invention, the compressed air quantity delivered through the dryer by means of the compressor is measured, as is the temperature and/or the humidity of the air sucked in from the atmosphere, and through the dryer there is always conducted an amount of compressed air such that said dryer can be regarded as being saturated under the assumption that the air is sucked in by the compressor and delivered through the air dryer at the highest possible ambient temperature and humidity, and the regeneration air quantity required for said compressed air quantity for the dryer to attain the desired dew point is determined as a function of the ambient temperature and/or the humidity of the intake air, and the regeneration of the dryer is carried out with said regeneration air quantity.

Since air at high temperatures, for example at +40° C., can hold significantly more water than at +20° C. or −10° C., more water is buffered in the dryer at high temperatures than at low temperatures for the same delivered air quantity. To remove said water again during the regeneration, more dry air must be used for regeneration at high temperatures. A regeneration is therefore first initiated whenever such an amount of compressed air has been conducted through the dryer that the latter can be regarded as being saturated, but then the required regeneration air quantity is determined as a function of the ambient temperature and/or the humidity of the intake air and the regeneration of the dryer is carried out with said regeneration air quantity.

In this way, it is ensured firstly that an adequate regeneration air quantity is provided even when air at the highest possible ambient temperature and humidity has actually been sucked in by the compressor and delivered through the air dryer such that the latter is actually saturated, but that at low ambient temperature and/or humidity of the intake air, a correspondingly low regeneration air quantity is conducted through the dryer.

In a refinement of the invention, it is provided that, in the case of the ambient temperature being used to determine the regeneration air quantity, the maximum possible value of the air humidity at the prevailing ambient temperature is used as a basis for the determination of the regeneration air quantity. The advantage of said refinement is that only one temperature sensor is required, since the maximum possible air humidity value at the respective temperature is known and can be stored in the control unit.

In another refinement of the invention, it is provided that, in the case of an air humidity sensor being used to determine the regeneration air quantity, the directly measured humidity content is used as a basis for the determination of the regeneration air quantity. The advantage of this refinement similarly to the advantage of the previous refinement, is that only one humidity sensor is required.

It is self-evidently also possible to measure both the ambient temperature and also the humidity of the air sucked in, from which the regeneration air quantity can then be determined directly.

In yet another refinement of the invention, the determined regeneration air quantity can be conducted from the compressed air storage reservoir through the dryer in a time-controlled manner, and the discharge time is determined as a function of the present storage pressure. The advantage of this refinement is that the required regeneration air quantity always flows through the dryer even when the pressure in the compressed air storage reservoir changes.

BRIEF DESCRIPTION OF THE DRAWINGS

The invention is best understood from the following detailed description of the drawings when read in connection with the accompanying drawings. Included in the drawings is the following FIGURE:

FIG. 1 schematically illustrates a pneumatic circuit diagram of the closed ride height control system according to aspects of the invention.

DETAILED DESCRIPTION OF THE PREFERRED EMBODIMENTS

The single FIGURE schematically illustrates a pneumatic circuit diagram of the closed ride height control system according to aspects of the invention, which is operated with compressed air and which comprises pressure medium chambers in the form of air springs 6a to 6d, a compressor 8, an air dryer 10 and a pressure medium storage reservoir 12. The pressure medium storage reservoir 12 is connected via a first pressure medium line 1, which is conducted via a first 3/2 directional control valve 2a and a check valve 31, to a compressor inlet 14 and via the controllable 3/2 directional control valve 2a and a fourth pressure line 4, in which a check valve 18 and the air dryer 10 are arranged, to a compressor outlet 16. The check valve 18 is arranged so as to open in the direction of the pressure medium storage reservoir 12.

Running parallel to the check valve 18 is a compressed air line 20 which is conducted via a throttle 22 to the air dryer outlet 40. The air dryer inlet 39 is connected via a second compressed air line 2 to a further 3/2 directional control valve 4a, which is connected via a third compressed air line 3 and a check valve 33 to a point 29 at which the first compressed air line 1 and the third compressed air line 3 are merged, from where there is a connection to the compressor inlet 14.

The check valves 31 and 33 are arranged so as to open in the direction of the compressor inlet 14.

The 3/2 directional control valve 4a is also connected to a pressure medium line 34 which can be connected via branches 28a to 38d and 2/2 directional control valves 26a to 26d to the air springs 6a to 6d.

Branching off from a point 36 is a compressed air line 32 in which a 2/2 directional control valve 30 is arranged and through which air can selectively be sucked in from the atmosphere and discharged.

Also conducted to the compressor inlet 14 is an intake line 5 in which are arranged an air filter 7 and a check valve 35 which opens in the direction of the compressor inlet 14.

A control unit 47 is connected to a pressure sensor 48 which determines the present storage pressure in the compressed air storage reservoir 12. An air temperature sensor 49 arranged in the intake line 5 and an air humidity sensor 50 arranged there are likewise connected to the control unit 47. A further pressure sensor 42 is connected to the compressed air line 34 and allows the air pressure prevailing in the individual compressed air chambers 6a to 6d, with corresponding actuation of the 2/2 directional control valves 26a to 26d, to be measured and transmitted to the control unit 47.

A drive, labelled as a motor M, for the compressor 8 and the 3/2 directional control valves 2a, 34a and the 2/2 directional control valves 26a to 26d and 30 are likewise connected by means of control lines to the control unit 47.

To charge the ride height control system with compressed air, the compressor 8 is activated by the control unit 47 via the control line 9, sucks air through the intake filter 7, the intake line 5 and the check valve 35, and delivers said air through the air dryer 10 via the check valve 18 and the compressed air line 4 and the 3/2 directional control valve 2a into the compressed air storage reservoir 12.

The compressor 10 subsequently delivers dried compressed air from the compressed air storage reservoir 12 via the 3/2 directional control valve 2a, the check valve 31, the compressed air line 2, the 3/2 directional control valve 4a and the compressed air line 34 to the branches 38a-38d and from there via the 2/2 directional control valves 26a-26d into the compressed air chambers 6a to 6d. Since the pressure in the compressed air storage reservoir 12 thereby falls, compressed air is subsequently newly sucked in via the compressed air line 5, compressed by the compressor 8, dried in the air dryer 10 and delivered into the compressed air storage reservoir 12 until the nominal pressure measured by the pressure sensor 48 is reached.

The temperature of the air sucked in is measured by the air temperature sensor 49 and the air humidity is measured by the air humidity sensor 50, and these are transmitted to the control unit 47. Furthermore, the air quantity delivered into the ride height control system is measured, which may take place for example by counting the number of revolutions of the compressor 8, since these are in a fixed ratio to the air quantity delivered by the compressor 8. The compressed air which has actually passed into the ride height control system is then determined from the number of motor revolutions, the measured air temperature and the measured air humidity.

During operation of the ride height control system, compressed air is delivered back and forth between the compressed air chambers 6a to 6d and the compressed air storage reservoir 12 in order to allow for the driving situations. Said mode of operation is described for example in EP 1 243 447 A2, the disclosure of which is incorporated in its entirety in this application.

Since the total volume of the pressure regulating system has a fixed value, the pressure prevailing in the pressure regulating system increases with rising temperatures and falls at low temperatures. This means that, with rising temperatures, compressed air must be discharged out of the system via the 2/2 directional control valve 30 and the compressed air line 32, and with falling temperatures, compressed air must be replaced again via the intake line 5 and the compressor 8. Furthermore, there are also leakage losses which must likewise be replaced.

During every discharge of compressed air from the ride height control system, said air flows through the dryer 10 and serves to regenerate the latter.

Regardless of compressed air discharge required on account of pressure fluctuations, intensive regeneration of the air dryer 10 is required from time to time, specifically if the air dryer 10 is saturated with moisture.

According to aspects of the invention, it is assumed that the air dryer 10 is saturated if there has been delivered into the ride height control system a compressed air quantity which, at an assumed maximum temperature value and an assumed maximum humidity value, leads to saturation of the air dryer 10. The control unit 47 determines, from the measured temperature and/or the moisture of the air sucked in from the atmosphere, the regeneration air quantity then required for the dryer 10, and activates a regeneration cycle during which the 3/2 directional control valve 2a is switched so as to allow a passage to the compressed air line 4 and the 3/2 directional control valve 4a is switched so as to allow a passage from the compressed air line 2 to the compressed air line 34, and in which the 2/2 directional control valve 30 is opened such that the regeneration air can escape into the atmosphere via the compressed air line 32. The regeneration air flowing through the dryer 10 is throttled in the throttle 22, wherein as a result of the expansion of the compressed air caused by the throttling action, an improved regeneration action of the dryer granulate situated in the air dryer 10 is attained, that is to say a relatively intense drying action is obtained with relatively little compressed air consumption.

Since not always the maximum nominal pressure prevails in the compressed air storage reservoir 12, the regeneration air quantity determined by the control unit 47 is conducted in a time-controlled manner from the compressed air storage reservoir 12 through the dryer 10, wherein the discharge time is varied as a function of the present storage pressure.

It should also be mentioned that a compressed air line 44 for an external connection is provided at the air dryer outlet 40, which compressed air line 44 is shut off in the direction of the air dryer outlet 40 by a check valve 46.

By means of the method according to aspects of the invention for controlling the regeneration cycles for the air dryer 10, it is possible to achieve minimal regeneration air quantity consumption, such that a maximum air quantity remains in the system and the function of the ride height control system is not impaired by the regeneration cycles.

The invention claimed is:

1. A method for controlling the regeneration cycles for an air dryer in a closed ride height control system for vehicles, by which ride height control system a vehicle body is suspended relative to at least one vehicle axle, having a plurality of compressed air chambers which are connected via respective branches to a compressed air line, having a compressor, and having an air dryer which is arranged in an air pressure line to a compressed air storage reservoir which is connected to the compressed air chambers in such a way that compressed air from the compressed air storage reservoir can be transferred into each compressed air chamber, and compressed air from each compressed air chamber can be transferred into the compressed air storage reservoir, such that the compressed air chambers and the compressed air storage reservoir are charged with compressed air and ventilated via a compressed air line which can be connected to atmosphere, or are charged via a compressed air intake line connected to the compressor and ventilated via the compressed air line, the method comprising:

measuring a compressed air quantity delivered through the dryer by the compressor;

measuring an ambient temperature or an ambient humidity of air sucked in from the atmosphere;

conducting an amount of compressed air through the dryer such that the dryer would be saturated if the amount of compressed air is at a highest possible ambient temperature and ambient humidity;

determining a regeneration air quantity needed in order to enable the dryer to attain a desired dew point using the measured compressed air quantity and the measured ambient temperature or ambient humidity of the air sucked in from the atmosphere; and regenerating the dryer with the regeneration air quantity.

2. The method as claimed in claim 1, wherein measuring the ambient temperature or the ambient humidity comprises measuring the ambient temperature, and the determining comprises using a high possible value of humidity at the measured ambient temperature to determine the regeneration air quantity.

3. The method as claimed in claim 1, wherein measuring the ambient temperature or the ambient humidity comprises measuring the ambient humidity, and the determining comprises using the measured ambient humidity to determine the regeneration air quantity.

4. The method as claimed in claim 1, further comprising conducting the regeneration air quantity from the compressed air storage reservoir through the dryer in a time-controlled manner, wherein a discharge time of the regeneration air quantity is determined as a function of a present storage pressure within the compressed air storage reservoir.

\* \* \* \* \*